Aug. 16, 1949.  G. H. FAGLEY  2,479,330
INDUCTION REGULATOR
Filed Aug. 19, 1944  2 Sheets-Sheet 1

Inventor:
Gilbert H. Fagley
by Harry E. Dunham
His Attorney

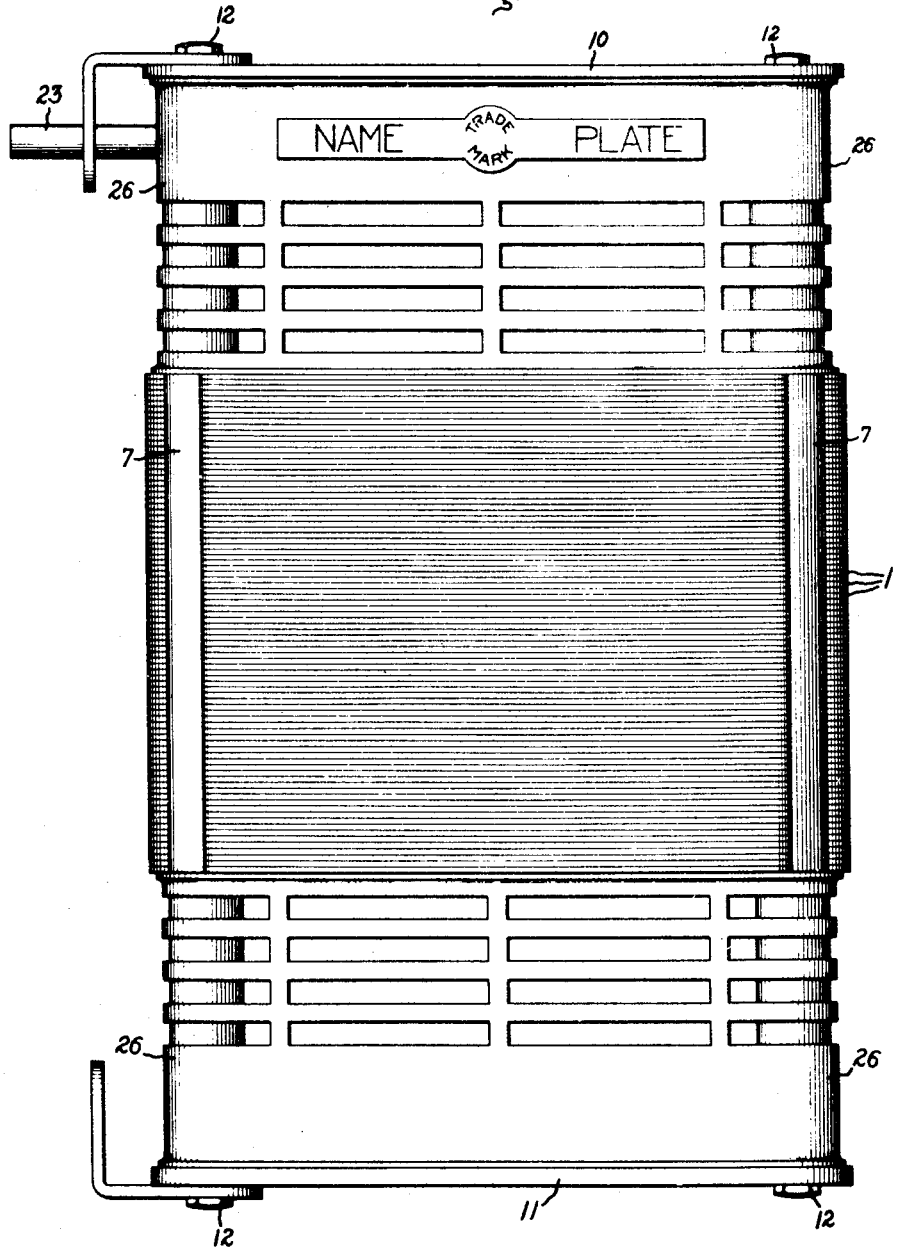

Patented Aug. 16, 1949

2,479,330

UNITED STATES PATENT OFFICE 2,479,330

INDUCTION REGULATOR

Gilbert H. Fagley, Pittsfield, Mass., assignor to General Electric Company, a corporation of New York Application August 19, 1944, Serial No. 550,194

10 Claims. (Cl. 171—119)

This invention relates to electric machines and more particularly to an improved laminated stator core construction for dynamo-type machines and to the method of making the same.

In electric machines of the dynamo type there is usually a laminated stator having a bore in which a rotor fits with a relatively small clearance or air gap. This rotor may either be mounted for unlimited rotation, as in the case of dynamos, or it may have limited rotation, as in the case of induction regulators. The paramagnetic stator laminations or punchings are usually clamped between rigid end plates or so-called flanges by means of studs, rivets or through-bolts which either pass through holes in the punchings or fit in slots or notches in the edges of the punchings. In this way the laminations are confined axially. In addition, the usual relatively massive field frame encloses the assembly. Furthermore, it is usually necessary to perform a lathe or boring mill operation after the laminations are clamped together in order properly to align the bore of the stator with the bearing supports for the rotor which are usually attached to the field frame.

In accordance with this invention end or core plates or flanges are entirely eliminated and the heavy end and side frames are replaced by comparatively light steel plates on the ends, to carry the rotor bearings, and comparatively light steel of thin gauge on the sides. In addition, the lathe or boring mill operation by skilled machinists is eliminated and the stator is assembled by simple drill press work which can be performed by relatively unskilled labor. The invention is characterized by cutting away a portion of the mounting holes in the laminations and providing a forced fit between the rods or rivets or studs which pass through these holes.

An object of the invention is to provide a new and improved electric machine construction.

A further object of the invention is to provide a new and improved laminated core and method of making the same.

Another object of the invention is to provide a light, simple and inexpensive laminated core construction.

The invention will be better understood from the following description taken in connection with the accompanying drawings and its scope will be pointed out in the appended claims.

Figure 1:
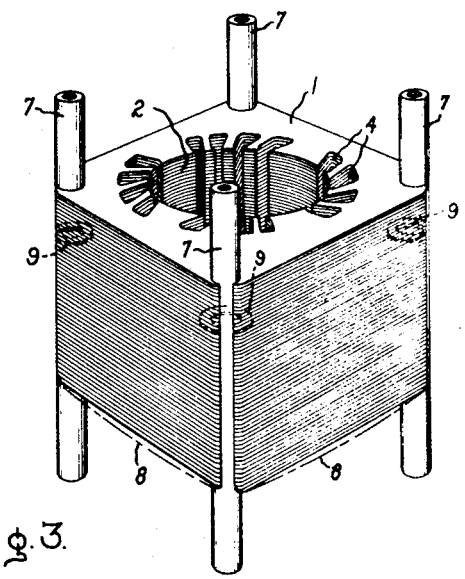
Figure 3:
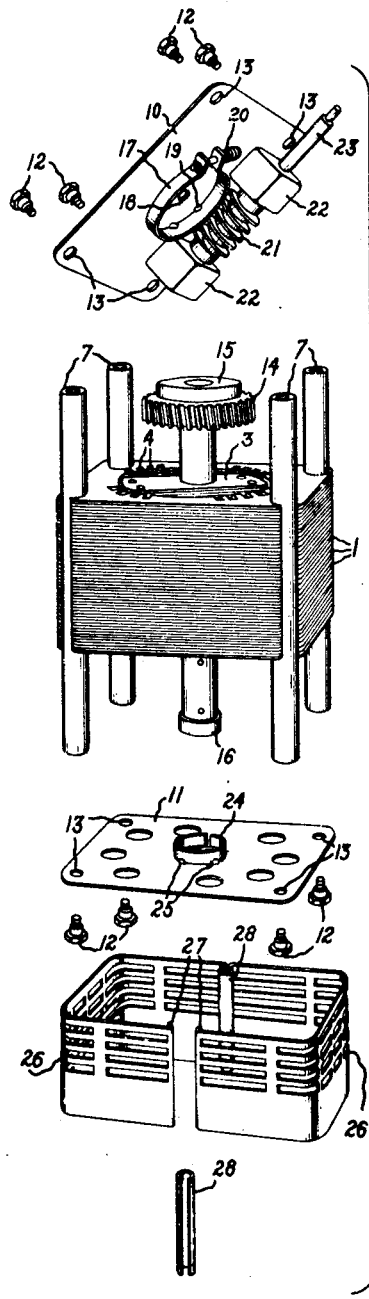
Figure 2:
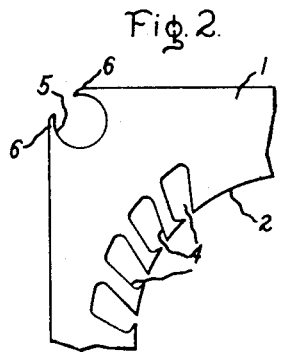

In the drawings Fig. 1 is a perspective view of the core punchings assembled on their mounting rods, Fig. 2 is a detailed view of a corner of one of the core punchings, Fig. 3 is an exploded view of a machine embodying my invention, and Fig. 4 is a side elevation of an assembled machine which embodies my invention.

Referring now to the drawings, in which like parts are designated by the same reference characters in the several views, the core comprises a plurality of laminations 1 which are punched out so as to provide a center opening 2 for the rotor 3. This opening is provided with slots 4 for the stator winding. Mounting holes 5 are provided near the edges of the laminations and have a minor portion of their periphery cut away so as to provide a slot having a pair of arms 6 on opposite sides thereof. By "minor portion" is meant less than half of the periphery.

Through-rods 7 are passed through the registering mounting holes in the laminations and the size of these rods is slightly larger than the size of the holes so that the holes are expanded principally from a bending strain instead of the radial stretching which would occur if the rods were completely confined by closed holes which did not have a cut-away portion. By means of this construction the allowance for the forced fit is several times greater than the conventional amount, that is, the difference in interference of hole and stud can be .008 tight as compared with dimensions of .002 inch for the usual forced fit. These dimensions are on the diameter. Furthermore, the tendency to gall and scrape or scratch the rods is eliminated or reduced to a negligible degree due to the relief afforded by the cut-away portions of the holes.

In assembling the core, the laminations 1 are placed one on top of the other with their openings in registration so as to form a stack of the desired height and the through-rods 7 are then pressed through the mounting holes by means of a drill press or hydraulic press. If desired, a pressure plate having openings for the through-rods can be placed on top of the stack so that when the through-rods are pressed down flush with the top surface of the pressure plate they will extend beyond the stack the proper amount in both directions.

As all of the laminations pinch the through-rods the core pressure is uniformly distributed throughout the length of the rods instead of being concentrated against the ends only, as in conventional construction. This permits the elimination of the usual machined core end plates or flanges.

In certain heights of core stacking the end laminations may tend to bulge somewhat, as exaggeratedly indicated by the dashed lines 8 in Fig. 1. This is because the laminations are only held together by their individual clamping or pinching action of the through-rods so that in between the through-rods the laminations are not held together as tightly as they are at the through-rods. This bulging can be eliminated by using spacers in the form of spring washers 9 for separating certain of the laminations.

The lamination dimensions which confine the through-rods 7 are faithfully maintained throughout the length of these rods so that the latter can be used for accurate location of the bearing plates 10 and 11 without any centering operations. Contrary to what might be supposed, the through-rods are held tight in the mounting holes and instead of assuming skewed positions they are maintained perfectly perpendicular to the surface of the laminations. Furthermore, they are maintained parallel with proper accuracy with respect to the bore and the extensions of these rods beyond the laminations are perfectly square. In addition, the rods can be ordinary commercial cold drawn steel stock whose diameter is not held to very close tolerances and no machining is necessary.

For mounting the bearing plates 10 and 11, both ends of the through-rods may be drilled and tapped by means of a drill bushing placed over each rod. Screws 12 may then be fitted into the tapped rods and they become the locators for the bearing plates which accommodate the bearings for the rotor. Thus, in the complete assembly the bearing plates have their mounting openings 13 engaged over the screws 12 and in this manner they are accurately aligned with the bore of the laminated core without the necessity of performing any machining operations.

Suitable bearings for the rotor 3 may be split sleeve or ring bearings, as shown in Fig. 3. The upper end of the rotor shaft carries an operating gear 14 which is keyed to the shaft and which has a smooth circular bearing section or flange 15. Similarly, the lower end of the rotor shaft carries a bearing sleeve 16. These bearing surfaces may be made of organic material bonded by a synthetic resin so as to make a hard, smooth surface which requires no lubrication. The upper bearing plate 10 carries a flexible bearing ring 17 which is centered on the plate 10 by means of a central hole 18 therein in cooperation with a welding electrode for fastening the ring 17 to the plate 10. The plate 10 carries embossed projections 19 by means of which the ring 17 is spot welded to the plate 10. In this manner the rotor is centered with the accuracy of a machined part. A spring and screw adjusting means 20 is provided so that the ring 17 can be made to fit the circular bearing surface 17 without any clearance and the rotor is prevented from radial vibration. The spring also causes the ring 17 to act as a brake to prevent circular vibrations and as a consequence the operating gear 14 does not produce noise and is a driver only. The gear 14 is engaged by a worm gear 21 carried in bearings 22 fastened to the plate 10 and having an operating shaft 23.

The lower bearing plate 10 carries a split ring bearing member 24 similar to part 17. It is shaped so that when it is assembled around 16 it is sprung outward in a true circle with no bearing clearance. Ring 24 is welded to the plate 11 by means of the embossed projections 25 on the plate 11.

As a result of this construction, in which the bearing supports are fastened directly to the rods which are clamped by the stator laminations, it is found that a very much shorter than normal air gap can be used. For example, I at present use an air gap of .017 inch in contrast with the usual air gap of about .040 inch. This very materially reduces the exciting current.

The assembly is completed by perforated side pieces or casing members 26 whose edges are folded inward with V bends 27. These V bends are engaged by an open seam tube 28 so as to hold the halves of the casing together and these casing members are slipped over the rods 7 and then fastened together by the tube 28 before the end bearing plates are put into place. Although only one pair of casing members is shown in Fig. 3, an upper and a lower pair are actually used in the completed assembly, as shown in Fig. 4.

While there has been shown and described a particular embodiment of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In combination, a laminated stator structure having a plurality of rods which are clamped between the sides of registering openings in the laminations, said rods being the sole means for holding the laminations together, said openings being provided with cut-away strain relieving sections whose separation is substantially less than the diameter of said rods, a rotor in said stator, bearings for said rotor, supports for said bearings on which said bearings are precentered, and means for fastening said supports to the ends of said rods.

2. The combination as in claim 1 in which the air gap between the rotor and stator is closer to .015 inch than to .035 inch.

3. An induction regulator comprising, in combination, a stator, a rotor, a gear attached to said rotor, a second gear mounted for rotation on said stator and meshed with the rotor gear, and a split ring bearing for said rotor mounted on said stator, said split ring bearing having sufficient friction closeness of fit to prevent the regulator from moving said rotor.

4. The combination as in claim 3 in which the rotor surface which is engaged by said split ring bearing is directly attached to the rotor gear structure.

5. A stator for an electrical machine comprising, in combination, a plurality of spaced parallel rods, and a plurality of thin flat laminations of magnetic material mounted in flatwise stacked relation against each other, each of said laminations having as many slots in their outer perimeter as there are rods, each of said slots having a pair of integral gripping arms which embrace tightly a different one of said rods throughout substantially more than half the circumference of said rods, the pressure between said rods and the gripping arms of said slots comprising the sole means for holding said laminations in position relative to each other, said rods extending a substantial distance on both sides beyond the outermost of said laminations for providing supports for a rotor for said stator.

6. The method of constructing the stator of a dynamo-type machine which comprises, providing a plurality of core laminations and two rotor bearing plates with mounting holes whose dimensions on centers are the same, said mounting holes in said laminations having cut-away portions so that gripping arms are provided on each side of the cut-away, stacking said laminations with their mounting holes in registration, pressing equal length straight rods equal distances through said registering mounting holes, said rods having a diameter slightly larger than the diameter of the mounting holes in said laminations whereby all of said arms grip said rods and maintain the spacing between the centers of corresponding ends of said rods the same as the spacing between centers of the mounting holes of said laminations, and fastening said bearing plates on the ends of said rods by means of the mounting holes in said plates whereby the axes of said plates are in alignment with the axes of said laminations.

7. The method of constructing the stator of a dynamo-type machine which comprises, providing a plurality of core laminations and two rotor bearing plates with mounting holes whose dimensions on centers are the same, said mounting holes in said laminations having cut-away portions so that gripping arms are provided on each side of the cut-away, stacking said laminations with their mounting holes in registration, pressing equal length straight rods equal distances through said registering mounting holes, said rods having a diameter of .006 inch to .008 inch larger than the diameter of the mounting holes in said laminations whereby all of said arms grip said rods and maintain the spacing between the centers of corresponding ends of said rods the same as the spacing between centers of the mounting holes of said laminations, and fastening said bearing plates on the ends of said rods by means of the mounting holes in said plates whereby the axes of said plates are in alignment with the axes of said laminations.

8. The method of fabricating a laminated stator core for induction machines of the type having a cylindrical rotor receiving bore so that through-rods which support the laminations are maintained parallel to the bore of the core which comprises, cutting away a minor portion of the holes for said through-rods in said laminations, stacking said laminations with said holes in registration, and pressing said through-rods through said holes so as to spring said cut-away holes from .002 to .008 inch whereby the arms formed by the cut-away portions of said holes grip said through-rods and hold said through-rods in accurate alignment relative to the bore of said stack of laminations.

9. The method of forming a laminated magnetic core of the type having a rotor receiving bore, which includes the steps of providing a plurality of identical laminations with a plurality of peripheral slots, stacking said laminations with said slots in registration, providing a plurality of straight hard metal rotor supporting rods of the same cross sectional shape as the shape of said slots but of slightly larger size and of substantially greater length than the thickness of said stack of laminations, and pressing said rods through the registering slots whereby said rods are held parallel with each other and said laminations are held together.

10. The method of mounting a rotor for an electric machine in the central bore of a laminated stator with a small air gap therebetween without machining said bore which includes, providing the rotor laminations with registering slots, passing straight oversize rods progressively through said slots whereby said rods are automatically held parallel with the axis of said bore, and providing end plates with precentered bearings for said rotor, and attaching said plates to said rods.

GILBERT H. FAGLEY.

REFERENCES CITED

The following references are of record in the file of this patent:

UNITED STATES PATENTS

| Number | Name | Date |
|---|---|---|
| 628,050 | Wait | July 4, 1899 |
| 1,323,045 | Gilbert | Nov. 25, 1919 |
| 1,603,545 | Johnson | Oct. 19, 1926 |
| 1,611,942 | Persons | Dec. 28, 1926 |
| 1,654,306 | Paszkowski | Dec. 27, 1927 |
| 1,661,135 | Knight | Feb. 28, 1928 |
| 1,685,656 | West | Sept. 25, 1928 |
| 1,695,799 | Daun | Dec. 18, 1928 |
| 1,771,475 | Wright | July 29, 1930 |
| 1,783,050 | Morrill | Nov. 25, 1930 |
| 1,795,882 | Noden | Mar. 10, 1931 |